UNITED STATES PATENT OFFICE.

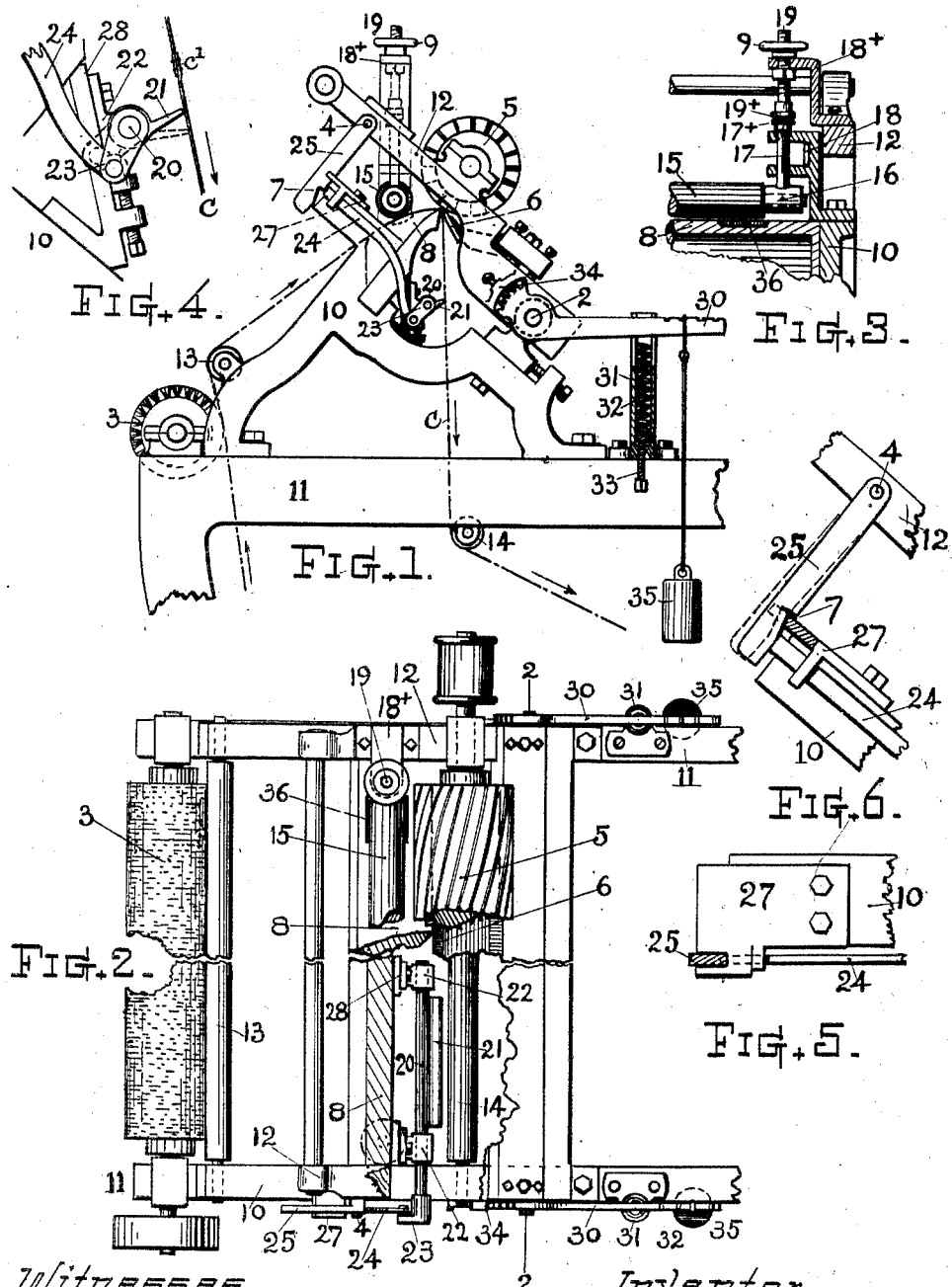

EDWARD F. BUTLER, SR., OF CAVENDISH, VERMONT, ASSIGNOR TO CURTIS & MARBLE MACHINE CO., OF WORCESTER, MASSACHUSETTS, A CORPORATION OF MASSACHUSETTS.

CLOTH-SHEARING MACHINE.

1,081,265.  Specification of Letters Patent.  Patented Dec. 9, 1913.

Application filed May 21, 1913. Serial No. 768,921.

*To all whom it may concern:*

Be it known that I, EDWARD F. BUTLER, Sr., a citizen of the United States, residing at Cavendish, in the county of Windsor and State of Vermont, have invented a new and useful Improvement in Cloth-Shearing Machines, of which the following is a specification, reference being made therein to the accompanying drawings.

In the shearing of cloth fabrics it is a well known practice to sew the ends of several cuts or lengths of cloth together, thus making a long continuous strip to be run through the shearing machine; thereby saving time and labor in the operation. When the connecting seams approach the shearing cutters it becomes necessary to lift the cutting devices, comprising the shearing revolver and ledger-blade, away from the cloth guiding rest to permit the seam to pass the shearing position without being cut. To facilitate this action the revolver and ledger-blade are commonly mounted on a swinging frame that can be raised at will. The construction of said frame and the arrangement of the cutter mechanism is well known to all persons conversant with the art.

In Letters Patent No. 7,018,296, heretofore granted me, there is described and claimed means for automatically lifting the cutting appliances by the action of the approaching seams, and wherein the cutters are lifted and allowed to drop back to place without hindrance, other than a slowness of action occasioned by a partial counter-weighing of the cutter supporting frame. While the method of action therein described is effective and efficient for certain classes of fabrics, and where only simple straight seams are to be passed over, there are many instances and conditions the requirements of which are not fully accommodated by said mechanism; furthermore, if the counter-weighting exceeds a limited proportional degree it interferes with the proper action of the shear by unduly lightening the effective gravity of the cutting appliances.

My present invention is designed for the improvement of mechanism of this class; the prime object being to provide, in a shearing machine having means for automatically lifting the shearing devices, for permitting the passage of seams or obstructions in the cloth, of means for positively retaining the cutters or shear devices elevated for a determined time, and means for then releasing and permitting said shear devices to assume normal working position when the seam has passed a predetermined distance beyond the cloth-guiding rest; said releasing means being controlled automatically, as more fully hereinafter explained.

Another object is to provide, in combination with means for automatically lifting the cutting-devices in a shearing machine, and means for temporarily retaining and for automatically releasing said cutting devices to assume normal position; of a resiliently acting means for giving a downward impulse to the revolver-frame when the releasing means acts, thus causing the shearing-cutters to quickly assume their normal working position.

With these and minor objects in view, my invention consists in the construction and combination of certain parts in a mechanism organized for operation as hereinafter described, and illustrated in the accompanying drawings; the particular subject matter claimed being definitely expressed in the summary.

In the drawings, Figure 1 represents a side view of such parts of a cloth-shearing machine as will illustrate my invention. Fig. 2 represents a plan view of the same, the lower half of the view being drawn with the upper members broken away to reveal the parts beneath. Fig. 3 is a fragmentary sectional view showing an arrangement of the gage roller and lifter connections. Fig. 4 is a fragmentary view representing the end of the release controller means. Fig. 5 is a fragmentary plan, and Fig. 6 a side view showing details of the retaining lock members.

Referring to the drawings and parts thereof, the numeral 11 indicates the main frame; 10 the upper frame or stand; 12 the cutter-supporting frame, commonly termed the revolver-frame, which is hinged or pivotally connected with the stand by the bearing member and axis-stud at 2, and having the shearing cutters comprising the revolver 5 and ledger-blade 6 mounted thereon.

8 indicates the cloth-guide, beam, bar or angular edged rest over which the cloth or fabric is drawn, for presenting its pile to the action of the shearing cutters as it runs through the machine.

The part of a shearing machine herein shown is that portion including the shearing appliances, and the run of the cloth from the brush 3 and guide-roll 13 to and past the guide-roll 14; the course of the cloth being indicated by the line C, and its direction of movement by the arrows.

All of the above named parts can be of the usual well known or any approved suitable construction; the operation of the shearing revolver and the feeding of the cloth through the machine being accomplished by means such as heretofore commonly employed and well known in the art; consequently a detailed description thereof herein is not required.

The means for automatically lifting the cutting devices away from the edge of the cloth-guide or shear-rest 8, to permit the passing of seams and obstructions, comprises a roller 15 that presses upon the top surface of the cloth as it runs over the rounded face of the shear-rest 8 at a position parallel with and near the cutting devices. At its ends said roller 15 is journaled in bearings 16 provided with vertical stems 17 (see Fig. 3) that are slidably mounted in housings or perforated ears 18 that are rigidly supported on the stand frame 10; said stems having abutting heads 17+ which disconnectedly supports a similar inverted head 19+ fixed to the lower end of a vertically disposed rod 19 that is adjustably secured, collarwise, in a housing or bracket 18+ attached to the cutter-carrying frame 12 upon which the revolver 5 and ledger-blade 6 are mounted; said roller and the lifter-rods or vertical stems 17 and 19 being adapted for swinging upward the revolver-frame 12 on its hinging pivots 2, and thereby raising the cutting-devices when a seam or obstruction approaches the cutters and comes between the curved face of the rest and the roller, substantially as set forth in my previous Letters Patent above mentioned; but are herein referred to as elements in the new combination or improved organization of mechanism. Adjustment of the relation of the cutters in respect to the rest and gage roller can be effected by the nuts 9 on the threaded stem or rod 19.

According to my present invention I provide, in combination with means for automatically lifting the revolver-frame 12 in the manner above described, a retaining and releasing mechanism, which is preferably constructed and adapted for operation as follows: Below the revolver-frame 12, and in rear of the guiding-rest 8, I arrange a shaft or rocker member 20 mounted in bearings 22 fixed to the frame or body of the rest, and occupying a position approximately parallel with the plane or spread of the cloth or fabric C where it passes from the edge of the shear-rest to the guide-roller 14. Said rocker member is provided with a projecting fin 21, or dull-edged longitudinal blade, the edge of which bears against the cloth at a slight upward angle in relation to the plane thereof, as best shown in Fig. 4. The rocker member 20 can be made to extend entirely across the available working width of the machine, or only partially across the same; the shorter form is herein illustrated. (See Fig. 2.) The end of the rocker-shaft is provided with a crank-arm 23, or a suitable connection means, to which a push-bar 24 is operatively connected.

25 indicates a swinging drop-bar or catch member, having its upper end pivotally attached to the cutter-supporting frame at 4, and its lower end extending down through a suitable guiding slot in a plate 27 that is fixed upon the bracket or stand 10; said bar being provided with a lug or notch 7 adapted for engagement with the plate, or a suitable offset on the frame when the cutter-supporting frame 12 and bar 25 are elevated, and to thereby retain said frame 12 and the shearing cutters at their elevated position away from the edge of the cloth-guiding rest 8. The end of the push-bar 24 extends through a guide formed on the plate 27 and abuts against the under side of the catch-bar 25 in such manner that a projective movement of the push-bar will throw off the lug or notch from its engaging member and leave the bar free to slide within the guiding slot.

In some instances the cuts of cloth have numbers or indicating marks sewed into or embroidered upon their heading, near to but a little away from the ends which are seamed together for the shearing operation. As it is desirable not to shear off such marks, I provide means for adjustment in the mechanism that will vary the interval in which the cutters are held elevated, thus permitting a longer or shorter portion of cloth to pass over the shear-rest without the cutters acting thereon. For this purpose the bearings 22 of the rocker member 20, are best arranged for adjustment up and down upon their seats 28, approximately parallel with the plane of the fabric, (see Figs. 1 and 4) so that the fin 21 can be located to contact with the cloth nearer to or farther from the edge of the shear-rest, or line at which the shearing cutters operate.

30 indicates arms attached to and projecting from the rear part of the swinging cutter-supporting frame 12. Said arms are arranged through slotted tubes 31 suitably attached to the machine frame, and each having therein a coiled spring 32 against the end of which the arm can strike when the frame 12, with the shearing devices, is elevated and said arms swing downward; the springs 32 being thereby compressed so as to serve for imparting a resilient impulse for effecting initial reactive movement of the frame 12 to bring the cutter devices quickly down to normal working position the instant the catch-bar 25 is released from engagement with the plate 27. The springs are best made somewhat shorter than the distance between the arm when elevated and the foot of the inclosing space, so that the arms are out of contact therewith when at their normal position; but will contact therewith when depressed.

33 indicates a screw or means for adjusting the spring within its tube to vary the degree of its effective action against the arm.

The arm 30 is best attached to the cutter-supporting frame 12 at the pivot joint 2, and provided with a notched segment and releasable locking member 34 that permits adjustment and release of the arm; so that the cutter-supporting frame can, after releasing said lock, be turned upward and backward to any required degree when access to the under side of the cutting devices is desired for any purpose, such as the removal or adjustment of the ledger-blade.

35 indicates the weight suspended from the arm 30 for partially counter-balancing the cutter mechanism.

Some classes of textile fabrics are woven with heavy selvages, thicker than the body portion of the fabric. In other instances thin selvages may become curled or rolled over at the edge at occasional intervals, thus causing an increased thickness of selvages. In order that such conditions may not cause lifting of the gage-roller 15 and cutters, I provide the shear-rest or guide-beam 8 with a recess or cavity 36 sunk in the face thereof underneath the end portions of the gage-roller 15, substantially as indicated in Fig. 3 and by dotted line on Fig. 1. Said recesses are made sufficiently deep below the normal level of the guiding surface of the rest, and of sufficient width to permit the thick or curled selvages to pass freely without effecting action of the gage-roller, but at the same time said selvage is supported upon the normal face of the rest at front and rear of the recess and also against the roller itself above the central part of the cavity. The shear-rest can be made either with or without the said recesses, as in any instance desired.

In the operation, when the cutter-supporting frame is automatically lifted (as provided for in my former patent) by a seam or obstruction in the cloth coming between the face of the rest and roller, the notch or lug 7 of the bar 25 catches upon the plate 27 and thereby positively retains the cutter-supporting frame elevated so long as the catch-bar remains in engagement: but when said seam or obstruction $c^1$ has passed over the edge of the shear-rest and is sufficiently beyond the shearing line, it runs against the fin 21 of the rocker member and swings it downward, (see dotted line, Fig. 4) and effects a rocking or oscillating movement of the shaft and crank 23 which causes the push-bar 24 to throw off the engaging bar 25, thus permitting the cutter-supporting frame and cutting devices to automatically assume their normal working position; the springs 32 acting to give to the cutter-supporting frame a quick return impulse the instant the catch bar 25 is disengaged.

What I claim and desire to secure by Letters Patent, is—

1. In a cloth-shearing machine, in combination, with a shear-rest over which the cloth is run, and means for automatically lifting the cutter-supporting frame and shearing cutters, controlled by the approach of a seam or obstruction in the cloth; means for engaging and positively retaining said cutter-supporting frame elevated, and means for releasing such engagement to permit said cutter-supporting frame and shearing cutters to assume normal working position, said releasing means being controlled by said seam or obstruction after it has passed to a determined position beyond the shear-rest.

2. In a cloth-shearing machine of the character described, the combination, with the hinged cutter-supporting-frame having the shearing revolver and ledger-blade mounted thereon, the shear-rest over which is adapted to run cloth, and means for directing the cloth as it passes away from said shear-rest, of a catch-bar attached to said cutter-supporting frame and having an engaging notch or lug for retaining the cutter-supporting frame elevated away from the shear-rest, a rocker member journaled in bearings at the rear of said shear-rest and having a fin adjacent to the surface of the cloth, and a connection actuated by said rocker-member for disengaging said catch-bar when said fin is depressed.

3. In a cloth-shearing machine, the combination of shearing cutters, a shear rest, means for automatically elevating the shear cutters, means for retaining said shearing cutters in elevated position, and means controlled from the cloth for releasing said shearing cutters to permit their return to normal working position.

4. In a cloth-shearing machine of the character described, the combination, with the swinging cutter-supporting frame having the shearing-revolver and ledger-blade mounted thereon, a shear-rest, and means for automatically lifting said cutter-supporting frame, actuated by the passing of a seam or obstruction in the cloth; of an arm connected with said cutter-supporting frame, a slotted stationary tubular guide through which said arm extends, and a coiled spring within said tubular guide adapted for contacting with said arm and for exerting an initial impulse for returning the cutter-supporting frame to normal working position.

5. In a cloth-shearing mechanism, the combination with a revolver-frame having the shearing cutters carried thereon, and the hinging axis connecting said revolver-frame with its stand; of a backwardly extended arm united with said revolver-frame at its hinging axis, the head of said arm having a recessed or indented segment, and a releasable locking member connecting the same with the revolver-frame, a guide fixed upon the stationary frame and embracing the sides of said arm, and a spring disposed beneath said arm, for the purpose set forth.

6. In a cloth-shearing machine, in combination with a shear-rest over which cloth is adapted to run, a swinging revolver-frame, a gage-roller adjacent to the face of said rest, the bearings of said roller having connections for raising the revolver-frame and cutter-devices as seams pass between said gage-roller and rest; a counter-weighting arm attached to the revolver-frame, a guide for said arm, an automatically acting engaging catch-device that acts for retaining the revolver-frame when elevated, mechanism for releasing said catch-device controlled by a seam-engaging means that contacts with the cloth at a predetermined distance below the position of the shearing mechanism.

7. In a cloth-shearing machine, in combination with the cutter mechanism, a shear-rest over which the cloth runs, and a gage-roller with connections adapted for lifting the cutter-mechanism when a seam or obstruction in the cloth passes beneath said roller; said shear-rest being provided with recesses sunk in the face thereof beneath the ends of said gage-roller, whereby thick or curled selvages can pass between the roller and rest without lifting said roller, substantially as set forth.

8. In a cloth-shearing machine comprising an automatic cutter-lifting means controlled by a gage-roller resting upon the cloth on the face of the guide-bar or shear-rest over which the cloth runs; a shear-rest provided with a cloth-supporting face having cavities or recesses formed therein concentric with and beneath the end portions of said gage-roller, for the purpose set forth.

Witness my hand this 14th day of May, 1913.

EDWARD F. BUTLER, Sr. [L. S.]

Witnesses:
MARION C. WHITE,
AURA J. AUSTIN.